(12) United States Patent
Takakubo

(10) Patent No.: US 8,213,785 B2
(45) Date of Patent: Jul. 3, 2012

(54) FOCUS DETECTION OPTICAL SYSTEM

(75) Inventor: Yutaka Takakubo, Saitama (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 48 days.

(21) Appl. No.: 12/980,683

(22) Filed: Dec. 29, 2010

(65) Prior Publication Data

US 2011/0170847 A1 Jul. 14, 2011

(30) Foreign Application Priority Data

Jan. 8, 2010 (JP) .................. 2010-002779
Dec. 17, 2010 (JP) .................. 2010-282183

(51) Int. Cl.
*G03B 13/36* (2006.01)
(52) U.S. Cl. ...................................... 396/114
(58) Field of Classification Search ............ 396/97, 396/111, 114
See application file for complete search history.

(56) References Cited

U.S. PATENT DOCUMENTS

| | | | |
|---|---|---|---|
| 4,650,309 A | | 3/1987 | Ishida et al. |
| 4,772,912 A | | 9/1988 | Ishida et al. |
| 4,774,539 A | * | 9/1988 | Suda et al. ............ 396/114 |
| 5,004,902 A | * | 4/1991 | Matsui et al. ........... 250/201.8 |
| 5,530,236 A | * | 6/1996 | Sensui ................. 250/201.8 |
| 7,817,912 B2 | * | 10/2010 | Kanai ..................... 396/114 |
| 2008/0285966 A1 | | 11/2008 | Kanai |
| 2011/0170847 A1 | * | 7/2011 | Takakubo ............... 396/114 |

FOREIGN PATENT DOCUMENTS

| | | |
|---|---|---|
| JP | S60-235110 | 11/1985 |
| JP | H02-1801 | 1/1990 |
| JP | 2008-286853 | 11/2008 |

* cited by examiner

*Primary Examiner* — W. B. Perkey
(74) *Attorney, Agent, or Firm* — Greenblum & Bernstein P.L.C.

(57) ABSTRACT

A focus detection optical system includes a condenser lens positioned behind an expected image plane of a photographing lens, an auxiliary lens positioned behind the condenser lens, and a separator lens including a pair of lenses behind the auxiliary lens. An object image formed on the expected image plane is divided into two images by the pair of lenses and reformed on a pair of areas on a sensor. The auxiliary lens is a plastic lens having a negative refractive power. The separator lens is a glass lens or a hybrid lens consisting of a glass substrate and a plastic lens having a curved surface which is layered onto the glass substrate, and the focus detection optical system satisfies the following condition (1):

$$0.068 < m_1/m_2 < 0.090 \qquad (1),$$

wherein $m_1$ and $m_2$ designate magnifications of first and second surfaces, respectively, of the auxiliary lens.

12 Claims, 8 Drawing Sheets

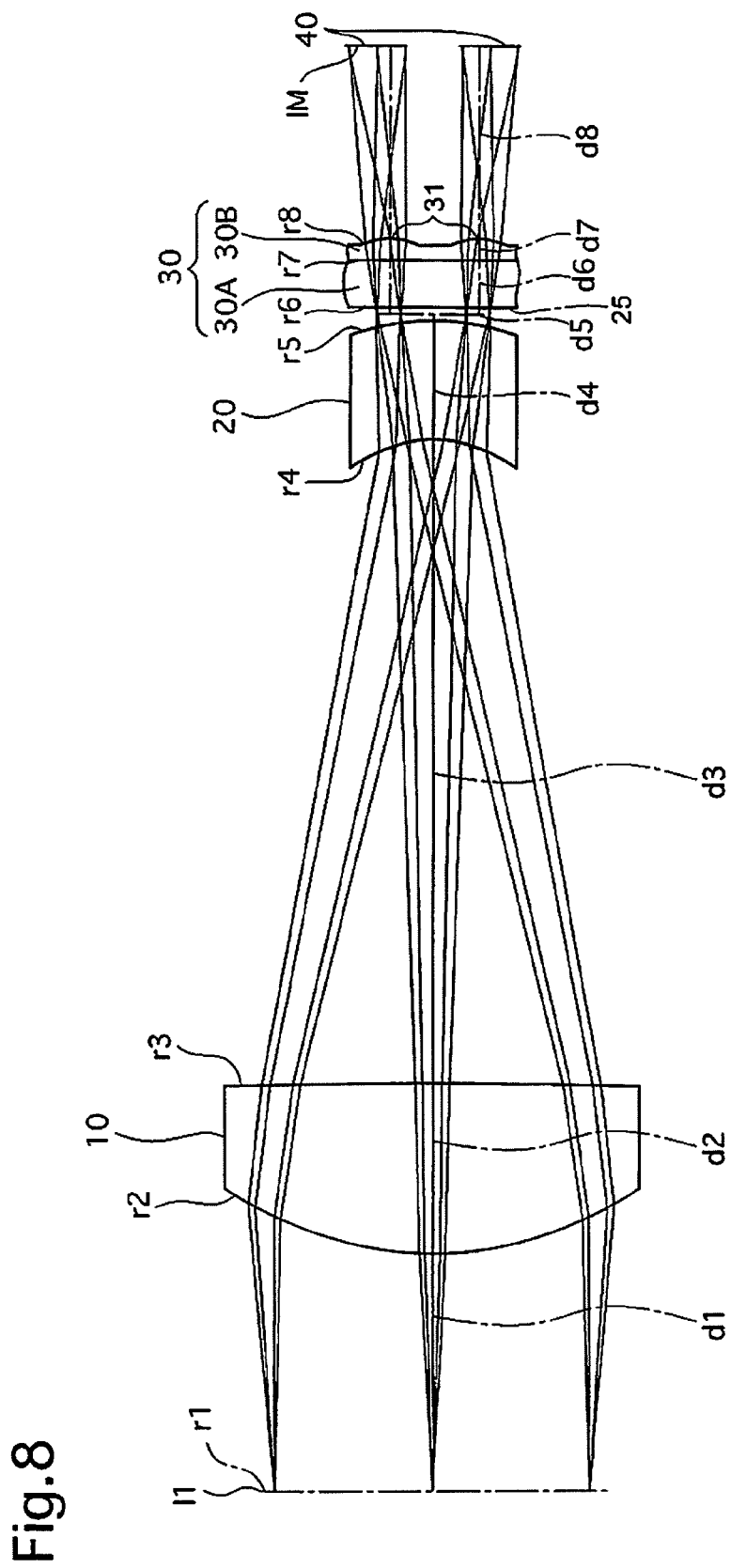

FOCUS DETECTION OPTICAL SYSTEM

BACKGROUND OF THE INVENTION

1. Field of the Invention

The present invention relates to a phase difference detection type focus detection optical system for use mainly in an SLR camera.

2. Description of the Related Art

In conventional SLR cameras, a so-called TTL phase-difference detection type focus detection optical system, in which an object image formed on an expected image plane is separated into two to be reformed onto a pair of line sensors by a separator lens having at least one pair of lenses, is used as a focus detection optical system for focus state detection.

In the case where a plastic (resin-made) lens is used as the separator lens, the distance (apex-to-apex distance) between the pair of lenses of the separator lens varies with temperature variation, and this distance variation causes the distance between a pair of object images respectively formed on the pair of line sensors to vary, thus causing a focus detection error to occur. In the focus detection optical system disclosed in Patent Document 1 (Japanese Unexamined Patent Publication S60-235110) that includes a plastic separator lens, the temperature of a focus detector is detected by a temperature sensor, and data on the defocus amount is corrected in accordance with the temperature detected by the temperature sensor. However, if the detection accuracy or responsiveness of the temperature sensor is not high, a focus detection error still frequently occurs.

Patent Document 2 (Japanese Unexamined Patent Publication H02-1801) discloses a focus detector in which a separator lens is configured from a hybrid lens consisting of a plastic lens and a glass lens to reduce the apex-to-apex distance of the pair of lenses of the separator lens that is caused by variations in temperature and humidity. However, the overall length of the focus detection optical system disclosed in Patent Document 2 is great.

In the focus detector disclosed in Patent Document 3 (Japanese Unexamined Patent Publication 2008-286853), an auxiliary lens having a negative refractive power is installed in front of a separator lens to reduce the length of a focus detection optical system. More specifically, the phase-difference detection type focus detection optical system disclosed in Patent Document 3 is provided with a condenser lens positioned behind an expected image plane of a photographing lens, an auxiliary lens positioned behind the condenser lens, and a separator lens positioned behind the auxiliary lens and having at least a pair of lenses; in addition, the auxiliary lens is configured from a plastic auxiliary lens having a negative refractive power and a glass auxiliary lens having a positive refractive power, and the separator lens is configured from a plastic lens. With this optical configuration, focal point variations caused by variations of the apex-to-apex distance of the pair of lenses of the plastic separator lens and focal point variations caused by variations in refractive power of the auxiliary lens cancel each other out.

However, in the focal length detecting optical system disclosed in Patent Document 3, to cancel out focal point variations caused by variations of the apex-to-apex distance of the pair of lenses of the plastic separator lens, a plastic auxiliary lens having a large negative refractive power and a glass auxiliary lens having a large positive refractive power for countering the large negative refractive power of the plastic auxiliary lens are required; accordingly, a focal detection error due to an eccentricity between the plastic auxiliary lens and the glass auxiliary lens is apt to occur. Additionally, such an optical configuration increases the number of elements.

SUMMARY OF THE INVENTION

The present invention has been devised based on an awareness of the above described issues in prior art and provides a focus detection optical system which is constructed from a small number of elements, is small in length, compact in size and capable of performing a focus detecting operation with no focus detection error by minimizing variations of the apex-to-apex distance of the pair of lenses of the separator lens due to ambient temperature variations.

The present invention has been accomplished based on the findings that, if a glass-molded lens or a hybrid lens made by layering a curved surface layer of plastic onto a glass substrate, either of which is sufficiently small in linear expansion (linear expansion coefficient) to a degree that variations of the apex-to-apex distance of the pair of lenses of the separator lens due to ambient temperature variations become negligible, is used as the separator lens, if an auxiliary lens made of plastic and having a negative refractive power is disposed in front of the separator lens (the glass-molded separator lens or the hybrid separator lens) and if various parameters (magnifications and refractive powers of a first surface (the surface facing the photographing lens) and a second surface (the surface facing the pair of line sensors), etc.) of the negative plastic auxiliary lens are appropriately determined, the length of the focus detection optical system can be reduced and the amount of variation in the focal point of the first surface and the amount of variation in the focal point of the second surface can be made to cancel each other out to minimize focal point variations of the entire auxiliary lens.

More specifically, a focus detection optical system according to an aspect of the present invention is provided, including a condenser lens positioned behind an expected image plane of a photographing lens; an auxiliary lens positioned behind the condenser lens in a direction along an optical axis of the condenser lens; and a separator lens including at least one pair of lenses positioned behind the auxiliary lens, wherein an object image formed on the expected image plane is divided into two images by the pair of lenses of the separator lens to be reformed on a pair of areas on a sensor, respectively, wherein the auxiliary lens includes a plastic lens having a negative refractive power, wherein the separator lens includes one of a glass lens and a hybrid lens that is configured of a glass substrate and a plastic lens having a curved surface which is layered onto the glass substrate, and wherein the focus detection optical system satisfies the following condition (1):

$$0.068 < m_1/m_2 < 0.090 \qquad (1),$$

wherein $m_1$ designates a magnification of a first surface (the surface facing the photographing lens) of the auxiliary lens, and $m_2$ designates a magnification of a second surface (the surface facing the pair of line sensors) of the auxiliary lens.

In another embodiment, a focus detection optical system is provided, including a condenser lens positioned behind an expected image plane of a photographing lens; an auxiliary lens positioned behind the condenser lens in a direction along an optical axis of the condenser lens; and a separator lens including at least one pair of lenses positioned behind the auxiliary lens, wherein an object image formed on the expected image plane is divided into two images by the pair of lenses of the separator lens to be reformed on a pair of areas on a sensor, respectively, wherein the auxiliary lens includes a plastic lens having a negative refractive power, wherein the separator lens includes one of a glass lens and a hybrid lens that is configured of a glass substrate and a plastic lens having a curved surface which is layered onto the glass substrate, and wherein the focus detection optical system satisfies the following condition (2):

$$-1.18 < (f_1/(s_1+f_1))/(f_2/(s_2+f_2)) < -0.88 \quad (2)$$

wherein $f_1$ designates a focal length of a first surface (the surface facing the photographing lens) of the auxiliary lens, $s_1$ designates an air-reduced distance from the expected image plane to the first surface of the auxiliary lens, $f_2$ designates a focal length of a second surface (the surface facing the pair of line sensors) of the auxiliary lens, and $s_2$ designates an air-reduced distance from the expected image plane to the second surface of the auxiliary lens.

The term "air-reduced distance" refers to a distance in a medium divided by the medium's index of refraction. The air-reduced distance in the case where more than one medium exists between the expected image plane of the photographing lens and the first surface of the auxiliary lens or between the expected image plane of the photographing lens and the second surface of the auxiliary lens corresponds to the sum of the air-reduced distances of all the media.

In another embodiment, a focus detection optical system comprises provided, including a condenser lens positioned behind an expected image plane of a photographing lens; an auxiliary lens positioned behind the condenser lens in a direction along an optical axis of the condenser lens; and a separator lens including at least one pair of lenses positioned behind the auxiliary lens, wherein an object image formed on the expected image plane is divided into two images by the pair of lenses of the separator lens to be reformed on a pair of areas on a sensor, respectively, wherein the auxiliary lens includes a plastic lens having a negative refractive power, wherein the separator lens includes one of a glass lens and a hybrid lens that is configured of a glass substrate and a plastic lens having a curved surface which is layered onto the glass substrate, and wherein the focus detection optical system satisfies the following condition (3):

$$1.8 < p_1/p_2 < 2.2 \quad (3),$$

wherein $p_1$ designates a refractive power of a first surface (the surface facing the photographing lens) of the auxiliary lens, and $p_2$ designates a refractive power of a second surface (the surface facing the pair of line sensors) of the auxiliary lens.

It is desirable for the following condition (4) to be satisfied:

$$-0.47 < m_0/m_3 < -0.37 \quad (4),$$

wherein $m_0$ designates a magnification of the entire focus detection optical system, and $m_3$ designates a magnification of the auxiliary lens.

It is desirable for the separator lens to be one of the hybrid lens and the glass lens that is configured of a single glass lens element, wherein the focus detection optical system further includes a separator lens mask positioned between the auxiliary lens and the separator lens and having a pair of apertures which face the pair of lenses of the separator lens, respectively. The focus detection optical system satisfies the following condition (5):

$$0 < (m_4-1) \cdot p \cdot t \cdot F/m_0 < 0.05 \text{ [mm]} \quad (5),$$

wherein $m_4$ designates a magnification of the separator lens, p designates a apex-to-apex distance [mm] between the pair of lenses of the separator lens (the distance between the apexes of the pair of lenses of the separator lens), t designates a linear expansion coefficient of one of the glass substrate and the glass lens of the separator lens due to a temperature change thereof by 30 degrees centigrade, F designates an f-number of the focus detection optical system that is determined by principal rays respectively passed through the pair of apertures of the separator lens mask, and $m_0$ designates a magnification of the entire focus detection optical system.

The term "linear expansion" refers to a numerical value which corresponds to a linear expansion coefficient multiplied by 30, corresponding to the temperature variation amount.

It is desirable for the separator lens to be a glass-molded lens which is molded by press molding.

According to the present invention, a focus detection optical system which is constructed from a small number of elements, is small in length, compact in size and capable of performing a focus detecting operation with no focus detection error by minimizing variations of the apex-to-apex distance of the pair of lenses of the separator lens due to ambient temperature variations is achieved.

The present disclosure relates to subject matter contained in Japanese Patent Applications Nos. 2010-2779 (filed on Jan. 8, 2010) and 2010-282183 (filed on Dec. 17, 2010), which are expressly incorporated herein by reference in their entireties.

BRIEF DESCRIPTION OF THE DRAWINGS

The present invention will be described below in detail with reference to the accompanying drawings in which:

FIG. 8 is an optical diagram showing a comparative example of a focus detection optical system.

DESCRIPTION OF THE PREFERRED EMBODIMENTS

Figure 1:
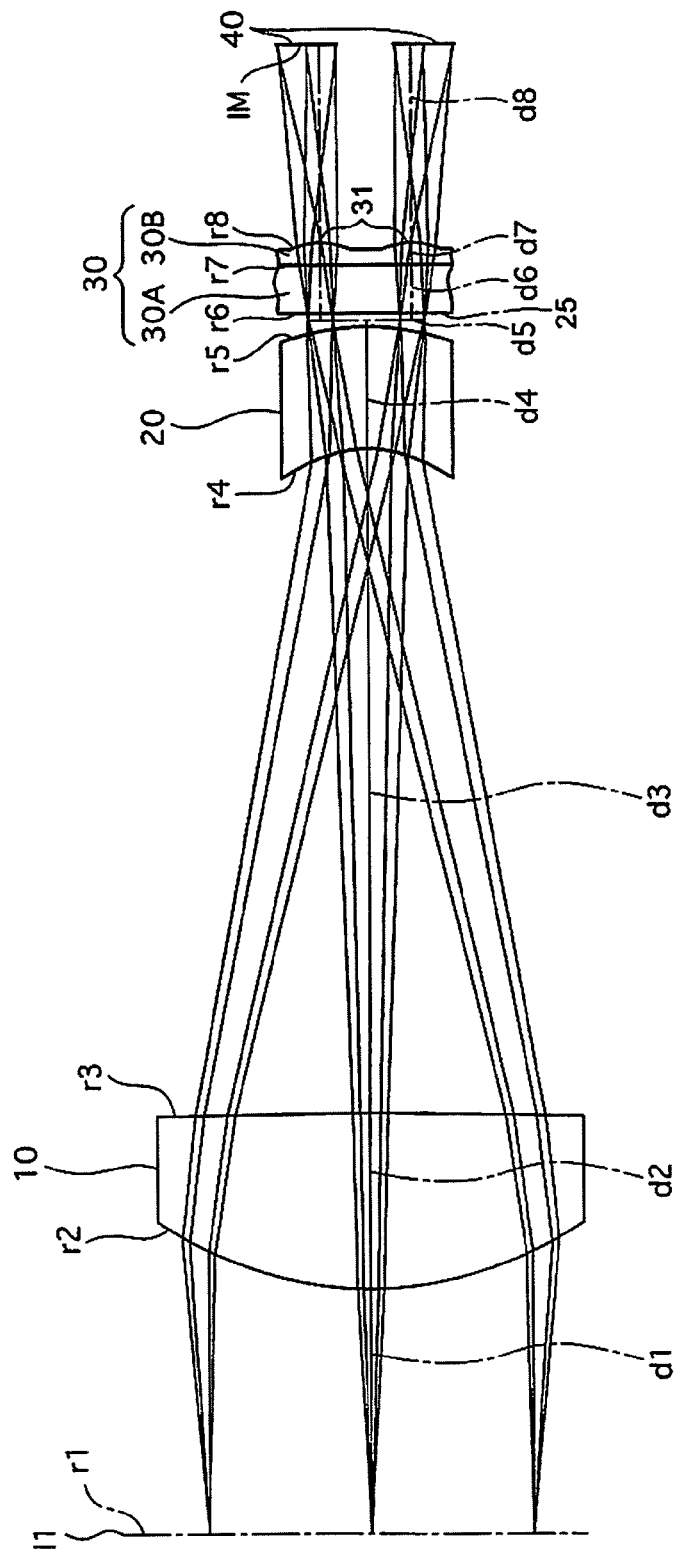
FIG. 1 is an optical diagram showing a first embodiment of a focus detection optical system according to the present invention.

FIGS. 1 through 7 show optical diagrams showing first through seventh embodiments of focus detection optical systems according to the present invention. Each of the first through seventh embodiments of the focus detection optical systems is provided with a condenser lens 10, an auxiliary lens 20, a separator lens 30 and an image sensor (pair of line sensors) 40 that are arranged behind an expected image plane I1 of a photographing lens (not shown) in that order. The condenser lens 10 consists of a plastic lens having a positive refractive power in each of the first through seventh embodiments. The auxiliary lens 20 consists of a plastic lens having a negative refractive power in each of the first through seventh embodiments. The separator lens 30 is provided with a pair of lenses by which a pair of object images, obtained by pupil-division of an object light bundle incident on the pair of lenses 31 from the auxiliary lens 20, are projected onto different zones of a light receiving surface IM of the image sensor 40. The separator lens 30 is configured of a hybrid lens including a glass substrate 30A and a plastic lens 30B having a curved surface which is layered onto the rear surface of the glass substrate 30A in each of the first through fourth embodiments. In each of the fifth through seventh embodiments, the separator lens 30 consists of a glass-molded lens. In each of the first through seventh embodiments, the focus detection optical system is provided between the auxiliary lens 20 and the separator lens 30 with a separator lens mask (aperture plate) 25 having a pair of apertures which face the pair of lenses 31 of the separator lens 30, respectively (the separator lens mask 25 is adhered to a surface of the separator lens 30 that faces the auxiliary lens 20). In the sixth embodiment, the focus detection optical system is provided between the condenser lens 10 and the auxiliary lens 20 with a reflection mirror 50 which is used for bending the focus detection optical system.

A focal point variation $df_1$ and a focal point variation $df_2$ that are caused by the first surface (the surface facing the photographing lens) and the second surface (the surface facing the image sensor 40) of the auxiliary lens 20, respectively, and a focal point variation $df_s$ which is caused by the separator lens 30 can be represented by the following equations:

$$df_1 = -(1-1/m_1)^2 \cdot f_1 \cdot q \cdot (1/m_c)^2$$

$$df_2 = -(1-1/m_2)^2 \cdot f_2 \cdot q \cdot (1/m_c)^2 \cdot (1/m_1)^2$$

$$df_s = -(1-m_4) \cdot p \cdot t \cdot F/m_0$$

wherein $f_1$ designates the focal length of the first surface (the surface facing the photographing lens) of the auxiliary lens 20;

$f_2$ designates the focal length of the second surface (the surface facing the image sensor 40) of the auxiliary lens 20;

$f_s$ designates the focal length of the separator lens 30;

$m_c$ designates the magnification of the condenser lens 10;

$m_0$ designates the magnification of the entire focus detection optical system;

$m_1$ designates the magnification of the first surface (the surface facing the photographing lens) of the auxiliary lens 20;

$m_2$ designates the magnification of the second surface (the surface facing the image sensor 40) of the auxiliary lens 20;

$m_4$ designates the magnification of the separator lens 30;

p designates the apex-to-apex distance (the distance between the apexes of the pair of lenses 31) [mm] between the pair of lenses 31 of the separator lens 30;

q designates the rate of focal length change of the plastic auxiliary lens 20 due to a temperature variation thereof by 30 degrees centigrade (which corresponds to the sum of a variation in shape of the auxiliary lens 20 and a variation in refractive index of the auxiliary lens 20 according to the linear expansion thereof);

F designates the f-number of the focus detection optical system that is determined by principal rays respectively passed through the pair of apertures of the separator lens mask 25; and t designates the linear expansion coefficient of the glass substrate 30A of the separator lens 30 or the single glass-molded lens comprising the separator lens 30 due to a temperature change thereof by 30 degrees centigrade.

If the sum of the focal point variation $df_1$ of the first surface of the auxiliary lens 20 and the focal point variation $df_2$ of the second surface of the auxiliary lens 20 is sufficiently small within a common range of ambient temperature (approximately 20±30 degrees centigrade), the focal point varies little regardless of temperature variations. Namely, the following condition (A) regarding focal point variations only needs to be satisfied within the aforementioned common range of ambient temperature (approximately 20±30 degrees centigrade):

$$|df_1 + df_2| < 0.03 \quad (A)$$

However, it is conceivable that the tolerance of the focal point variation may vary according to the depth of focus or the like that is determined by the pixel size (image size) of an image sensor (image pickup device) or the like, and the tolerance of the depth of focus is usually set to the order of 0.02 to 0.05 mm, though it changes according to the f-number of the photographing lens in the case of, e.g., an SLR camera. Accordingly, the sum of the focal point variations respectively caused by the optical elements of the focus detection optical system of an SLR camera needs to be smaller than 0.05 mm, desirably smaller than 0.02 mm.

The lenses that constitute the focus detection optical system are the following three elements: the condenser lens 10, the auxiliary lens 20 and the separator lens 30. Although the condenser lens 10 has a positive refractive power, since the condenser lens 10 is positioned behind the expected image plane I1 of the photographing lens at an extremely close vicinity thereto, the variation in focal length of the condenser lens 10 due to ambient temperature variations is negligible. In addition, a reduction in the amount of variation in focal length of the separator lens 30 due to ambient temperature variations to a negligible degree has been achieved by forming the separator lens 30 from a hybrid lens or a glass-molded lens. Additionally, in each of the present embodiments, various conditions for maintaining the focal length variation, due to ambient temperature variations, down to a minimum are defined also for the auxiliary lens 20 that has a high degree of effectiveness of reducing the length of the focus detection optical system.

Specifically, each of conditions (1), (2) and (3) is for making the focal point variation $df_1$ and the focal point variation $df_2$, which are respectively caused by the first surface and the second surface of the auxiliary lens 20, cancel out each other to reduce the focal point variation which occurs by the entire part of the auxiliary lens 20.

If the value "$m_1/m_2$" in condition (1) exceeds the upper limit (=0.090) and/or the value "$p_1/p_2$" in condition (3) exceeds the upper limit (=2.2), under high temperature conditions, the photographing lens is brought to a front focus state (in which an image is formed at a position that is closer to the object side than the light receiving surface of the image sensor 40) in which the photographing lens is not focused at a point on the actual light receiving surface even if a focusing operation is carried out on the photographing lens so that the detection result of the focus detection optical system determines (judges) that the photographing lens has obtained an in-focus state. If the value "$m_1/m_2$" in condition (1) falls below the lower limit (=0.068) and/or the value "$p_1/p_2$" in condition (3) falls below the lower limit (=1.8), under high temperature conditions, the photographing lens is brought to a rear focus state (in which an image is formed at a position behind the light receiving surface of the image sensor 40) in which the photographing lens is not focused at a point on the actual light receiving surface even if a focusing operation is carried out on the photographing lens so that the detection result of the focus detection optical system determines (judges) that the photographing lens has obtained an in-focus state.

If the value "$(f_1/(s_1+f_1))/(f_2/(s_2+f_2))$" in condition (2) exceeds the upper limit (=−0.88), under high temperature conditions, the photographing lens is brought to a rear focus state in which the photographing lens is not focused at a point on the actual light receiving surface even if a focusing operation is carried out on the photographing lens so that the detection result of the focus detection optical system determines (judges) that the photographing lens has obtained an in-focus state. If the value "$(f_1/(s_1+f_1))/(f_2/(s_2+f_2))$" in condition (2) falls below the lower limit (=−1.18), under high temperature conditions, the photographing lens is brought to a front focus state in which the photographing lens is not focused at a point on the actual light receiving surface even if a focusing operation is carried out on the photographing lens so that the detection result of the focus detection optical system determines (judges) that the photographing lens has obtained an in-focus state.

Figure 6:
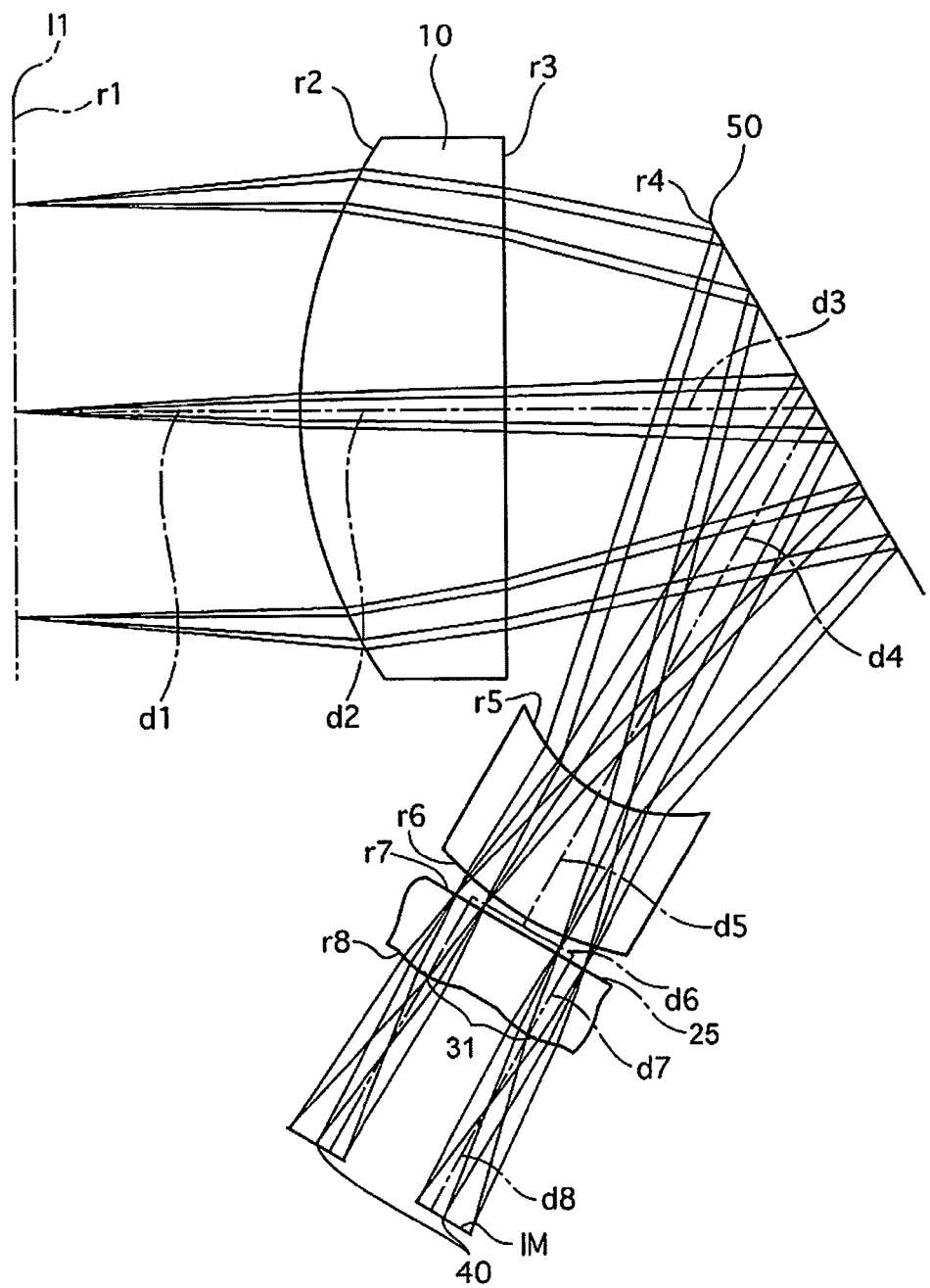
FIG. 6 is an optical diagram showing a sixth embodiment of the focus detection optical system according to the present invention which is configured from the optical elements of the fifth embodiment of the focus detection optical system shown in FIG. 5 and a reflection mirror.

Condition (4) defines the ratio of the magnification $m_0$ of the entire focus detection optical system to the magnification $m_3$ of the auxiliary lens 20. Condition (4) is for reducing the length of the focus detection optical system and for making installation of the reflection mirror 50 (used to bend the focus detection optical system) between the condenser lens 10 and the auxiliary lens 20 possible, as shown in FIG. 6 that shows the sixth embodiment of the focus detection optical system.

If the value "$(m_0/m_3)$" in condition (4) exceeds the upper limit (=−0.37), the negative refractive power of the auxiliary lens 20 becomes too small, which becomes a cause of an increase in the length of the focus detection optical system. If the value "$(m_0/m_3)$" in condition (4) falls below the lower limit (=−0.47), the distance between the condenser lens 10 and the auxiliary lens 20 becomes too small, which makes it difficult to install the reflection mirror 50 (used to bend the focus detection optical system) between the condenser lens 10 and the auxiliary lens 20.

Condition (5) defines the relationship among the following factors: the magnification $m_4$ of the separator lens 30, the apex-to-apex distance p [mm] of the pair of lenses 31 of the separator lens 30, the linear expansion coefficient t of the glass substrate 30A or the single glass-molded lens comprising the separator lens 30 due to a temperature change thereof by 30 degrees centigrade, the f-number F of the focus detection optical system that is determined by principal rays respectively passed through the pair of apertures of the separator lens mask 25, and the magnification $m_0$ of the entire focus detection optical system. Condition (5) is for selecting an appropriate material in consideration of the ambient temperature variation characteristic of the material of the separator lens 30. Condition (5) is also for reducing the focal point variation $d f_s$ due to the separator lens 30 by reducing the variation of the apex-to-apex distance of the pair of lenses 31 of the separator lens 30 according to the linear expansion thereof. The term "linear expansion" herein denotes the numerical value which corresponds to the linear expansion coefficient multiplied by 30 corresponding to the temperature variation amount. In each of the first through fourth embodiments which will be discussed below, the linear expansion coefficient of the glass substrate 30A is $68×10^{-7}$/K, so that the linear expansion coefficient t becomes 0.0002 (t=0.0002) by multiplying $68×10^{-7}$/K by 30.

If the value "$(m_4−1)·p·t·F/m_0$" in condition (5) exceeds the upper limit (=0.05 mm), under high temperature conditions, the photographing lens is brought to a front focus state in which the photographing lens is not focused at a point on the actual light receiving surface even if a focusing operation is carried out on the photographing lens so that the detection result of the focus detection optical system determines (judges) that the photographing lens has obtained an in-focus state, due to a variation in the apex-to-apex distance between the pair of lenses 31 of the separator lens 30 which is caused by a linear expansion of the separator lens 30. If the value "$(m_4−1)·p·t·F/m_0$" in condition (5) falls below the lower limit (=0), under high temperature conditions, the photographing lens is brought to a rear focus state in which the photographing lens is not focused at a point on the actual light receiving surface even if a focusing operation is carried out on the photographing lens so that the detection result of the focus detection optical system determines (judges) that the photographing lens has obtained an in-focus state, due to a variation in the apex-to-apex distance between the pair of lenses 31 of the separator lens 30 which is caused by a linear expansion of the separator lens 30.

The following is a description of the numerical data of the first through seventh embodiments of the focus detection optical systems according to the present invention. In the lens configuration drawings and tables below, r designates the radius of curvature of each lens surface, d designates the lens thickness or the distance between the lens elements, $N_d$ designates the refractive index at the d-line, and ν designates the Abbe number for the d-line.

Embodiment 1

FIG. 1 is a lens system configuration of the first embodiment of the focus detection optical system according to the present invention. Table 1 below shows numerical data on the first embodiment of the focus detection optical system. In this optical system, the condenser lens 10 (surface numbers 2 and 3), the auxiliary lens 20 (surfaces numbers 4 and 5), the separator lens 30 (surface numbers 6 through 8) and the image sensor (line sensor) 40 are arranged behind the expected image plane I1 (surface number 1) of the photographing lens (not shown), in that order from the photographing lens side. The condenser lens 10 consists of a plastic lens having a positive refractive power. The auxiliary lens 20 consists of a plastic lens having a negative refractive power. The separator lens 30 includes a pair of lenses 31 by which a pair of object images, obtained by pupil-division of an object light bundle incident on the pair of lenses 31 from the auxiliary lens 20, are projected onto different zones of a light receiving surface IM of the image sensor 40. The separator lens 30 is configured of a hybrid lens consisting of a glass substrate 30A and a plastic lens 30B having a curved surface which is layered onto the rear surface of the glass substrate 30A. A separator lens mask (aperture plate) 25 having a pair of apertures is installed between the auxiliary lens 20 and the separator lens 30 so that the pair of apertures face the pair of lenses 31 of the separator lens 30, respectively (the separator lens mask 25 is adhered to a surface of the separator lens 30 on a surface thereof on the auxiliary lens 20 side).

TABLE 1

| Surface No. | r | d | $N_d$/ν |
|---|---|---|---|
| 1 | ∞ | 5.50 | |
| 2 | 9.346 | 4.00 | 1.54358/55.7 |
| 3 | −149.084 | 15.20 | |
| 4 | −3.233 | 2.80 | 1.54358/55.7 |
| 5 | −6.401 | 0.30 | |
| 6 | ∞ | 1.10 | 1.51633/64.1 |
| 7 | ∞ | 0.50 | 1.52972/42.7 |

TABLE 1-continued

| Surface No. | r | d | $N_d/v$ |
|---|---|---|---|
| 8 | −1.892 | 4.54 | |
| IM | ∞ | | |

Embodiment 2

Figure 2:
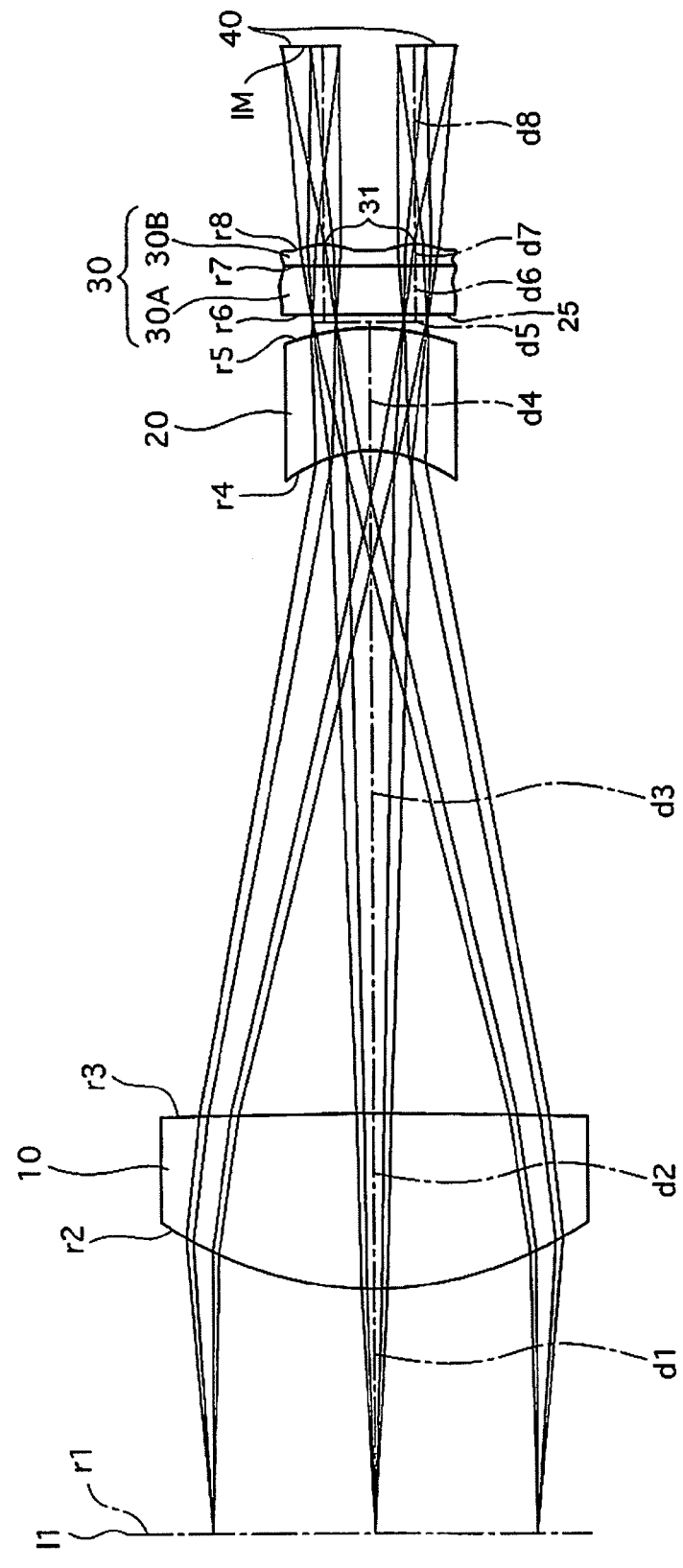
FIG. 2 is an optical diagram showing a second embodiment of the focus detection optical system according to the present invention.

FIG. 2 is a lens system configuration of the second embodiment of the focus detection optical system according to the present invention. Table 2 below shows numerical data on the second embodiment of the focus detection optical system. The lens system configuration of this embodiment is identical to that of the first embodiment of the focus detection optical system.

TABLE 2

| Surface No. | r | d | $N_d/v$ |
|---|---|---|---|
| 1 | ∞ | 5.50 | |
| 2 | 10.197 | 4.00 | 1.54358/55.7 |
| 3 | −84.696 | 16.18 | |
| 4 | −3.778 | 2.80 | 1.54358/55.7 |
| 5 | −7.064 | 0.30 | |
| 6 | ∞ | 1.10 | 1.51633/64.1 |
| 7 | ∞ | 0.50 | 1.52972/42.7 |
| 8 | −1.952 | 4.62 | |
| IM | ∞ | | |

Embodiment 3

Figure 3:
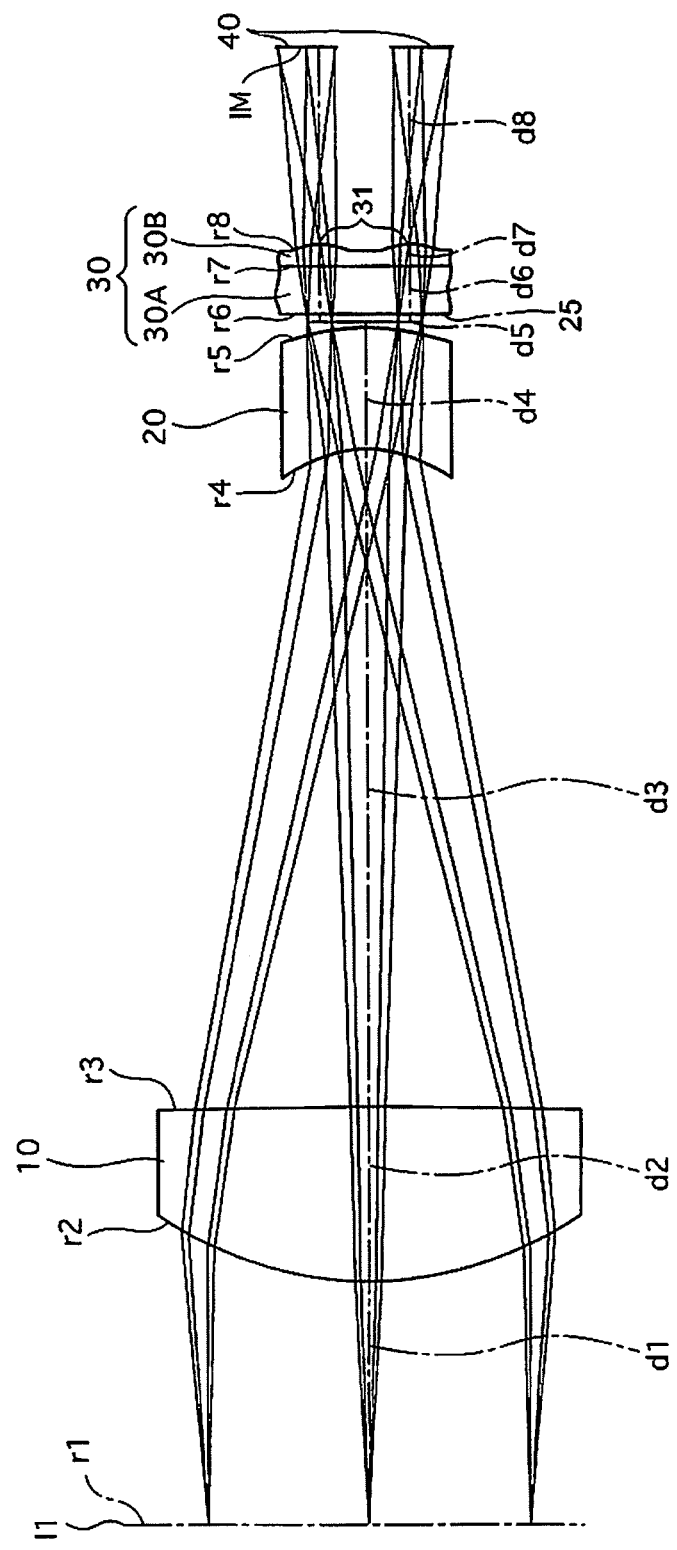
FIG. 3 is an optical diagram showing a third embodiment of the focus detection optical system according to the present invention.

FIG. 3 is a lens system configuration of the third embodiment of the focus detection optical system according to the present invention. Table 3 below shows numerical data on the third embodiment of the focus detection optical system. The lens system configuration of this embodiment is identical to that of the first embodiment of the focus detection optical system.

TABLE 3

| Surface No. | r | d | $N_d/v$ |
|---|---|---|---|
| 1 | ∞ | 5.50 | |
| 2 | 8.668 | 4.00 | 1.54358/55.7 |
| 3 | −523.858 | 14.34 | |
| 4 | −2.875 | 2.80 | 1.54358/55.7 |
| 5 | −5.956 | 0.30 | |
| 6 | ∞ | 1.10 | 1.51633/64.1 |
| 7 | ∞ | 0.50 | 1.52972/42.7 |
| 8 | −1.838 | 4.46 | |
| IM | ∞ | | |

Embodiment 4

Figure 4:
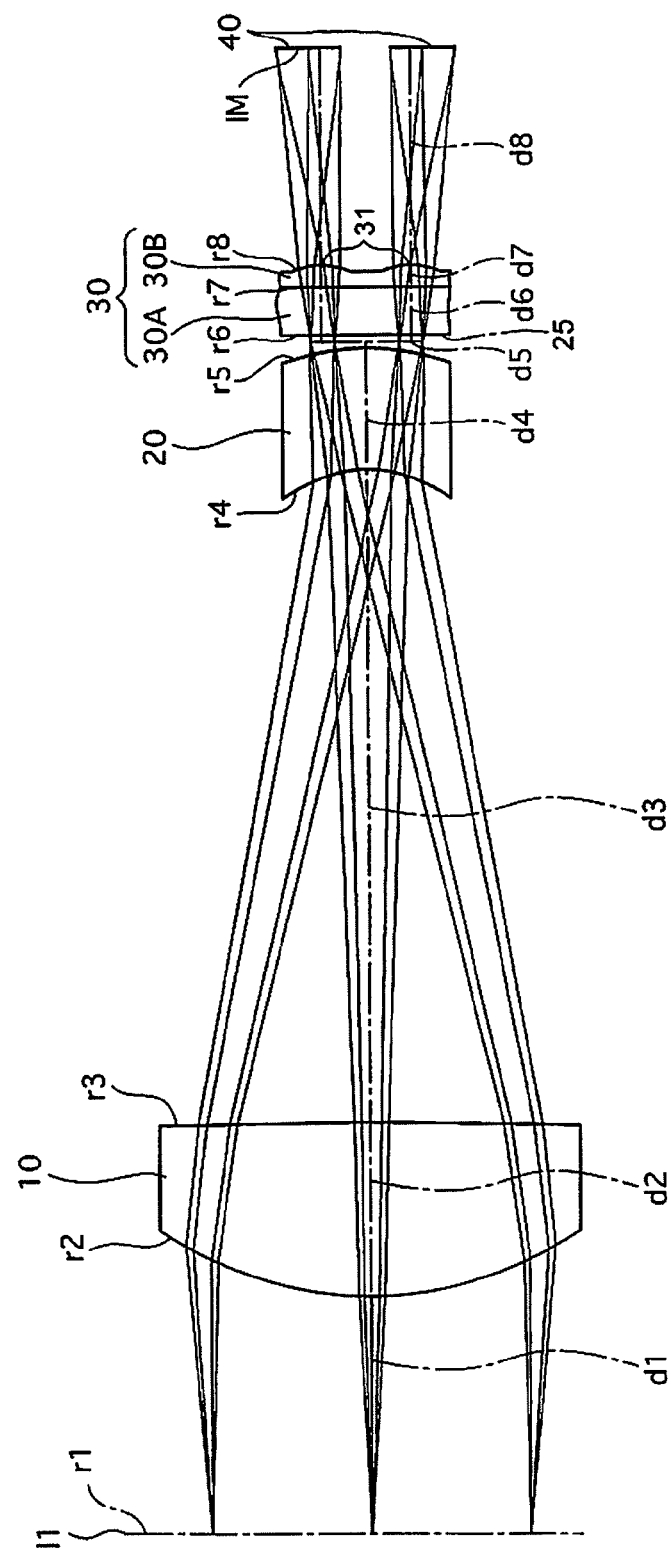
FIG. 4 is an optical diagram showing a fourth embodiment of the focus detection optical system according to the present invention.

FIG. 4 is a lens system configuration of the fourth embodiment of the focus detection optical system according to the present invention. Table 4 below shows numerical data on the fourth embodiment of the focus detection optical system. The lens system configuration of this embodiment is identical to that of the first embodiment of the focus detection optical system.

TABLE 4

| Surface No. | r | d | $N_d/v$ |
|---|---|---|---|
| 1 | ∞ | 5.50 | |
| 2 | 9.432 | 4.00 | 1.54358/55.7 |
| 3 | −127.472 | 15.20 | |
| 4 | −3.444 | 2.80 | 1.54358/55.7 |
| 5 | −6.640 | 0.30 | |
| 6 | ∞ | 1.10 | 1.51633/64.1 |
| 7 | ∞ | 0.50 | 1.52972/42.7 |
| 8 | −2.088 | 5.10 | |
| IM | ∞ | | |

Embodiment 5

Figure 5:
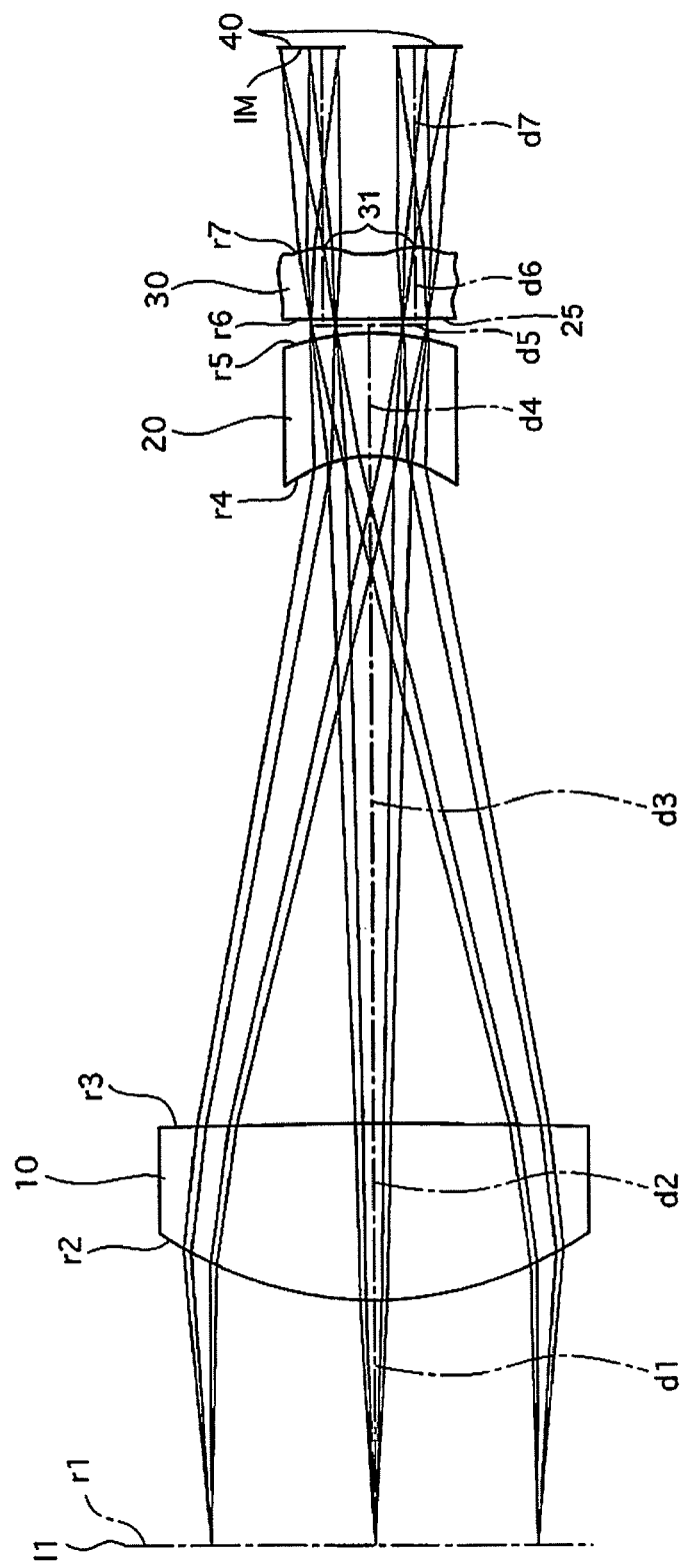
FIG. 5 is an optical diagram showing a fifth embodiment of the focus detection optical system according to the present invention.

FIG. 5 is a lens system configuration of the fifth embodiment of the focus detection optical system according to the present invention. Table 5 below shows numerical data on the fifth embodiment of the focus detection optical system. The lens system configuration of this embodiment is identical to that of the first embodiment of the focus detection optical system except that the separator lens 30 consists of a glass-molded lens.

TABLE 5

| Surface No. | r | d | $N_d/v$ |
|---|---|---|---|
| 1 | ∞ | 5.50 | |
| 2 | 8.862 | 4.00 | 1.54358/55.7 |
| 3 | −451.517 | 14.77 | |
| 4 | −2.820 | 2.80 | 1.54358/55.7 |
| 5 | −5.897 | 0.30 | |
| 6 | ∞ | 1.60 | 1.58913/61.1 |
| 7 | −1.847 | 3.94 | |
| IM | ∞ | | |

Embodiment 6

FIG. 6 is a lens system configuration of the sixth embodiment of the focus detection optical system according to the present invention. Table 6 below shows numerical data on the sixth embodiment of the focus detection optical system. The lens system configuration of this embodiment is identical to that of the fifth embodiment of the focus detection optical system except that a reflection mirror 50 which is used for bending the focus detection optical system is installed between the condenser lens 10 and the auxiliary lens 20.

TABLE 6

| Surface No. | r | d | $N_d/v$ |
|---|---|---|---|
| 1 | ∞ | 5.50 | |
| 2 | 8.862 | 4.00 | 1.54358/55.7 |
| 3 | −451.517 | 6.10 | |
| 4 | ∞ | 8.67 | Mirror |
| 5 | −2.820 | 2.80 | 1.54358/55.7 |
| 6 | −5.897 | 0.30 | |
| 7 | ∞ | 1.60 | 1.58913/61.1 |
| 8 | −1.847 | 3.94 | |
| IM | ∞ | | |

Embodiment 7

Figure 7:
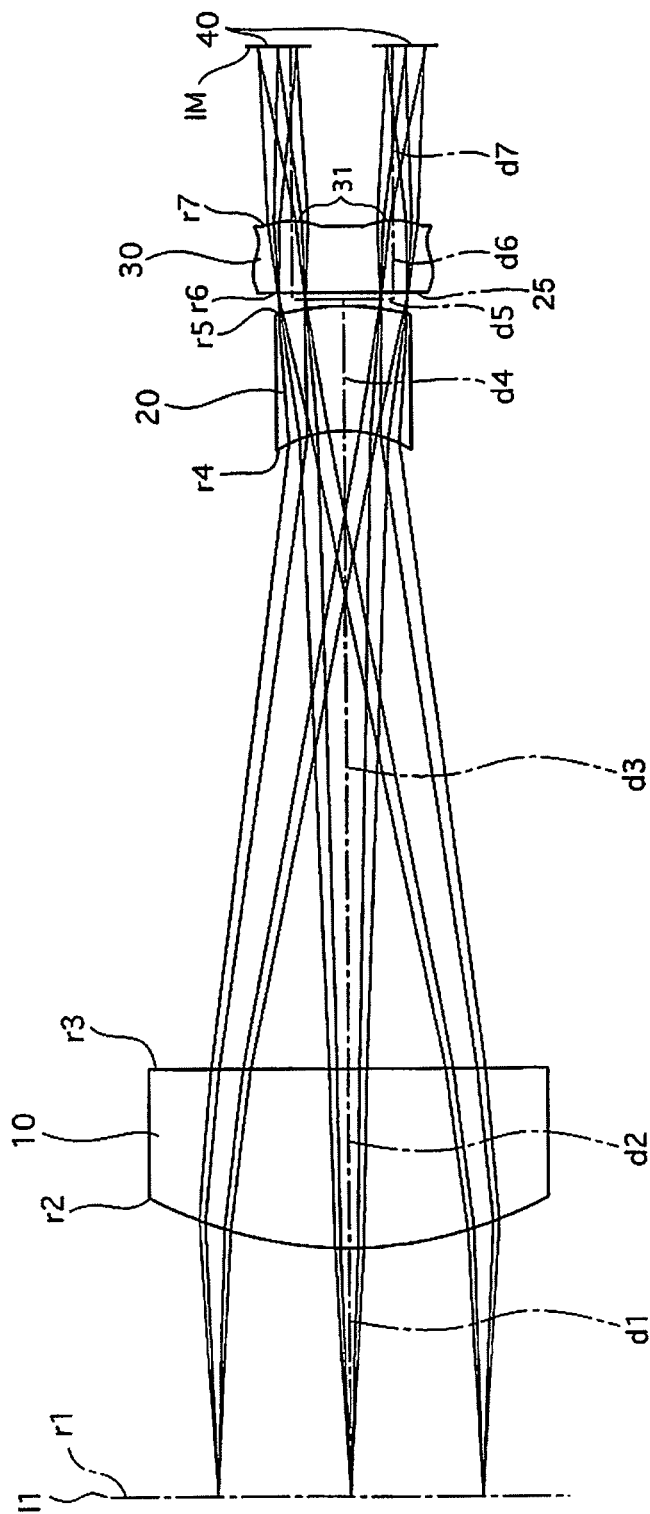
FIG. 7 is an optical diagram showing a seventh embodiment of the focus detection optical system according to the present invention.

FIG. 7 is a lens system configuration of the seventh embodiment of the focus detection optical system according to the present invention. Table 7 below shows numerical data on the seventh embodiment of the focus detection optical system. The lens system configuration of this embodiment is identical to that of the fifth embodiment of the focus detection optical system.

TABLE 7

| Surface No. | r | d | $N_d/\nu$ |
|---|---|---|---|
| 1 | ∞ | 5.50 | |
| 2 | 9.088 | 4.00 | 1.58547/29.9 |
| 3 | 788.066 | 14.34 | |
| 4 | −2.788 | 2.80 | 1.58547/29.9 |
| 5 | −5.975 | 0.30 | |
| 6 | ∞ | 1.60 | 1.58913/61.1 |
| 7 | −1.820 | 3.92 | |
| IM | ∞ | | |

Comparative Example

FIG. 8 is a lens system configuration of a comparative example of a focus detection optical system. Table 8 below shows numerical data on this focus detection optical system. This focus detection optical system is provided with a condenser lens 10, a plastic auxiliary lens 20, a separator lens mask 25, a separator lens 30 (a glass substrate 30A and a plastic lens 30B) and an image sensor 40 that are arranged behind an expected image plane I1 of the photographing lens (not shown), and various parameters (magnifications and refractive powers of the first surface and the second surface, etc.) of the plastic auxiliary lens 20 are different from those of the plastic auxiliary lens 20 of each of the first through seventh embodiments of the focus detection optical systems.

TABLE 8

| Surface No. | r | d | $N_d/\nu$ |
|---|---|---|---|
| 1 | ∞ | 5.50 | |
| 2 | 9.833 | 4.00 | 1.54358/55.7 |
| 3 | −335.337 | 16.97 | |
| 4 | −3.327 | 2.80 | 1.54358/55.7 |
| 5 | −4.944 | 0.30 | |
| 6 | ∞ | 1.10 | 1.51633/64.1 |
| 7 | ∞ | 0.50 | 1.52972/42.7 |
| 8 | −2.164 | 4.76 | |
| IM | ∞ | | |

Table 9 below shows the numerical data obtained by assigning numerical data of the first through seventh embodiments and the comparative example to condition (1).

TABLE 9

| | | | Condition(1) | |
|---|---|---|---|---|
| | $m_1$ | $m_2$ | $m_1/m_2$ | Judgment |
| Embodiment 1 | 0.184 | 2.304 | 0.080 | ○ |
| Embodiment 2 | 0.203 | 2.303 | 0.088 | ○ |
| Embodiment 3 | 0.172 | 2.300 | 0.075 | ○ |
| Embodiment 4 | 0.194 | 2.308 | 0.084 | ○ |
| Embodiment 5 | 0.167 | 2.301 | 0.073 | ○ |
| Embodiment 6 | 0.167 | 2.301 | 0.073 | ○ |
| Embodiment 7 | 0.159 | 2.303 | 0.069 | ○ |
| Comparative Example | 0.181 | 4.005 | 0.045 | X |

Table 10 below shows the numerical data obtained by assigning numerical data of the first through seventh embodiments and the comparative example to condition (2).

TABLE 10

| | $f_1$ | $s_1$ | $f_2$ | $s_2$ | Cond. (2) | Judgment |
|---|---|---|---|---|---|---|
| Embod. 1 | −5.948 | 26.874 | 11.776 | 31.196 | −1.037 | ○ |
| Embod. 2 | −6.950 | 27.858 | 12.995 | 32.180 | −1.156 | ○ |
| Embod. 3 | −5.289 | 26.012 | 10.957 | 30.334 | −0.962 | ○ |
| Embod. 4 | −6.336 | 26.874 | 12.215 | 31.196 | −1.096 | ○ |
| Embod. 5 | −5.188 | 26.448 | 10.848 | 30.770 | −0.936 | ○ |
| Embod. 6 | −5.188 | 26.448 | 10.848 | 30.770 | −0.936 | ○ |
| Embod. 7 | −4.762 | 26.181 | 10.205 | 30.620 | −0.889 | ○ |
| Comparative Example | −6.121 | 28.644 | 9.097 | 32.966 | −1.257 | X |

Table 11 below shows the numerical data obtained by assigning numerical data of the first through seventh embodiments and the comparative example to condition (3).

TABLE 11

| | | Condition(3) | | |
|---|---|---|---|---|
| | $p_1$ | $p_2$ | $p_1/p_2$ | Judgment |
| Embodiment 1 | −91.39 | −46.16 | 1.980 | ○ |
| Embodiment 2 | −78.21 | −41.83 | 1.870 | ○ |
| Embodiment 3 | −102.77 | −49.61 | 2.072 | ○ |
| Embodiment 4 | −85.80 | −44.50 | 1.928 | ○ |
| Embodiment 5 | −104.78 | −50.11 | 2.091 | ○ |
| Embodiment 6 | −104.78 | −50.11 | 2.091 | ○ |
| Embodiment 7 | −122.95 | −57.37 | 2.143 | ○ |
| Comparative Example | −88.81 | −59.76 | 1.486 | X |

Table 12 below shows the numerical data obtained by assigning numerical data of the first through seventh embodiments and the comparative example to condition (4). As shown in Table 14, which will be discussed later, the length (optical path length) of the comparative example of the focus detection optical system that does not satisfy condition (4) is 35.93 mm, whereas the length (optical path length) of each of the first through seventh embodiments of the focus detection optical systems that satisfies condition (4) is in the range from 32.46 to 35.00 mm, and accordingly, a reduction in length of each of the first through seventh embodiments of the focus detection optical systems to a degree of approximately 3 to 10 percent as compared with the comparative example is achieved.

TABLE 12

| | | Condition(4) | | |
|---|---|---|---|---|
| | $m_0$ | $m_3$ | $m_0/m_3$ | Judgment |
| Embodiment 1 | −0.177 | 0.425 | −0.416 | ○ |
| Embodiment 2 | −0.179 | 0.468 | −0.382 | ○ |
| Embodiment 3 | −0.175 | 0.396 | −0.442 | ○ |
| Embodiment 4 | −0.202 | 0.447 | −0.452 | ○ |
| Embodiment 5 | −0.150 | 0.385 | −0.390 | ○ |
| Embodiment 6 | −0.150 | 0.385 | −0.390 | ○ |
| Embodiment 7 | −0.150 | 0.365 | −0.412 | ○ |
| Comparative Example | −0.176 | 0.726 | −0.243 | X |

Table 13 below shows the numerical data obtained by assigning numerical data of the first through seventh embodiments and the comparative example to condition (5).

TABLE 13

|  | $m_4$ | p | F | t | Cond. (5) | Judgment |
|---|---|---|---|---|---|---|
| Embod. 1 | −0.272 | 2.259 | 10.6 | 0.0002 | 0.036 | ○ |
| Embod. 2 | −0.252 | 2.292 | 10.6 | 0.0002 | 0.036 | ○ |
| Embod. 3 | −0.286 | 2.226 | 10.6 | 0.0002 | 0.035 | ○ |
| Embod. 4 | −0.295 | 2.227 | 10.6 | 0.0002 | 0.034 | ○ |
| Embod. 5 | −0.255 | 2.283 | 10.6 | 0.0002 | 0.043 | ○ |
| Embod. 6 | −0.255 | 2.283 | 10.6 | 0.0002 | 0.043 | ○ |
| Embod. 7 | −0.268 | 2.261 | 10.6 | 0.0002 | 0.042 | ○ |
| Comparative Example | −0.166 | 2.435 | 10.6 | 0.0002 | 0.036 | ○ |

Table 14 below shows the relationship among the length of the focus detection optical system, the focal point variation $df_1$ of the first surface of the auxiliary lens 20, the focal point variation $df_2$ of the second surface of the auxiliary lens 20, and the sum of the focal point variation $df_1$ and the focal point variation $df_2$ ($df_1$ and $df_2$) in the case where temperature changes by 30 degrees centigrade.

TABLE 14

|  | Length | $df_1$ | $df_2$ | $df_1 + df_2$ |
|---|---|---|---|---|
| Embodiment 1 | 33.94 | 0.448 | −0.427 | 0.021 |
| Embodiment 2 | 35.00 | 0.420 | −0.396 | 0.024 |
| Embodiment 3 | 33.00 | 0.462 | −0.446 | 0.016 |
| Embodiment 4 | 34.50 | 0.419 | −0.399 | 0.020 |
| Embodiment 5 | 32.90 | 0.494 | −0.477 | 0.018 |
| Embodiment 6 | 32.90 | 0.494 | −0.477 | 0.018 |
| Embodiment 7 | 32.46 | 0.512 | −0.496 | 0.016 |
| Comparative Example | 35.93 | 0.526 | −0.656 | −0.131 |

As described above, each of the first through seventh embodiments satisfies all of conditions (1) through (5), and the comparative example satisfies none of conditions (1) through (4). As a result, the focal point displacement |d $f_1$+d $f_2$| in each of the first through seventh embodiments is sufficiently small, ranging from 0.016 mm to 0.024 mm; in contrast, the focal point displacement |d $f_1$+d $f_2$| in the comparative example is 0.131 mm, thus greater than the focal point displacement |d $f_1$+d $f_2$| in each of the first through seventh embodiments by five to eight times. In addition, the sixth embodiment is different from the fifth embodiment only in that the optical path is bent in the sixth embodiment as shown in FIG. 6, the sixth embodiment satisfies all of conditions (1) through (5), and it can be understood from Table 14 that the focal point displacement |d $f_1$+d $f_2$| in the sixth embodiment is sufficiently small.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A focus detection optical system comprising:
a condenser lens positioned behind an expected image plane of a photographing lens;
an auxiliary lens positioned behind said condenser lens in a direction along an optical axis of said condenser lens; and
a separator lens including at least one pair of lenses positioned behind said auxiliary lens,
wherein an object image formed on said expected image plane is divided into two images by said pair of lenses of said separator lens to be reformed on a pair of areas on a sensor, respectively,
wherein said auxiliary lens includes a plastic lens having a negative refractive power,
wherein said separator lens includes one of a glass lens and a hybrid lens that is configured of a glass substrate and a plastic lens having a curved surface which is layered onto said glass substrate, and
wherein said focus detection optical system satisfies the following condition (1):

$$0.068 < m_1/m_2 < 0.090 \qquad (1),$$

wherein $m_1$ designates a magnification of a first surface of said auxiliary lens, and
$m_2$ designates a magnification of a second surface of said auxiliary lens.

2. The focus detection optical system according to claim 1, wherein said focus detection optical system satisfies the following condition (4):

$$-0.47 < m_0/m_3 < -0.37 \qquad (4)$$

wherein $m_0$ designates a magnification of the entire said focus detection optical system, and
$m_3$ designates a magnification of said auxiliary lens.

3. The focus detection optical system according to claim 1, wherein said separator lens comprises one of said hybrid lens and said glass lens that is configured of a single glass lens element,
wherein said focus detection optical system further comprises a separator lens mask positioned between said auxiliary lens and said separator lens and having a pair of apertures which face said pair of lenses of said separator lens, respectively, and
wherein said focus detection optical system satisfies the following condition (5):

$$0 < (m_4-1) \cdot p \cdot t \cdot F/m_0 < 0.05 \text{ [mm]} \qquad (5)$$

wherein $m_4$ designates a magnification of said separator lens,
p designates a apex-to-apex distance [mm] between said pair of lenses of said separator lens,
t designates a linear expansion coefficient of one of said glass substrate and said glass lens of said separator lens due to a temperature change thereof by 30 degrees centigrade,
F designates an f-number of said focus detection optical system that is determined by principal rays respectively passed through said pair of apertures of said separator lens mask, and
$m_0$ designates a magnification of the entire said focus detection optical system.

4. The focus detection optical system according to claim 1, wherein said separator lens comprises a glass-molded lens which is molded by press molding.

5. A focus detection optical system comprising:
a condenser lens positioned behind an expected image plane of a photographing lens;
an auxiliary lens positioned behind said condenser lens in a direction along an optical axis of said condenser lens; and
a separator lens including at least one pair of lenses positioned behind said auxiliary lens,
wherein an object image formed on said expected image plane is divided into two images by said pair of lenses of said separator lens to be reformed on a pair of areas on a sensor, respectively,
wherein said auxiliary lens includes a plastic lens having a negative refractive power, wherein said separator lens includes one of a glass lens and a hybrid lens that is configured of a glass substrate and a plastic lens having a curved surface which is layered onto said glass substrate, and wherein said focus detection optical system satisfies the following condition (2):

$$-1.18 < (f_1/(s_1+f_1))/(f_2/(s_2+f_2)) < -0.88 \qquad (2)$$

wherein $f_1$ designates a focal length of a first surface of said auxiliary lens, $s_1$ designates an air-reduced distance from said expected image plane to said first surface of said auxiliary lens, $f_2$ designates a focal length of a second surface of said auxiliary lens, and $s_2$ designates an air-reduced distance from said expected image plane to said second surface of said auxiliary lens.

6. The focus detection optical system according to claim 5, wherein said focus detection optical system satisfies the following condition (4):

$$-0.47 < m_0/m_3 < -0.37 \qquad (4),$$

wherein $m_0$ designates a magnification of the entire said focus detection optical system, and $m_3$ designates a magnification of said auxiliary lens.

7. The focus detection optical system according to claim 5, wherein said separator lens comprises one of said hybrid lens and said glass lens that is configured of a single glass lens element, wherein said focus detection optical system further comprises a separator lens mask positioned between said auxiliary lens and said separator lens and having a pair of apertures which face said pair of lenses of said separator lens, respectively, and wherein said focus detection optical system satisfies the following condition (5):

$$0 < (m_4-1) \cdot p \cdot t \cdot F/m_0 < 0.05 \text{ [mm]} \qquad (5),$$

wherein $m_4$ designates a magnification of said separator lens, p designates a apex-to-apex distance [mm] between said pair of lenses of said separator lens, t designates a linear expansion coefficient of one of said glass substrate and said glass lens of said separator lens due to a temperature change thereof by 30 degrees centigrade, F designates an f-number of said focus detection optical system that is determined by principal rays respectively passed through said pair of apertures of said separator lens mask, and $m_0$ designates a magnification of the entire said focus detection optical system.

8. The focus detection optical system according to claim 5, wherein said separator lens comprises a glass-molded lens which is molded by press molding.

9. A focus detection optical system comprising:

a condenser lens positioned behind an expected image plane of a photographing lens;

an auxiliary lens positioned behind said condenser lens in a direction along an optical axis of said condenser lens; and a separator lens including at least one pair of lenses positioned behind said auxiliary lens, wherein an object image formed on said expected image plane is divided into two images by said pair of lenses of said separator lens to be reformed on a pair of areas on a sensor, respectively, wherein said auxiliary lens includes a plastic lens having a negative refractive power, wherein said separator lens includes one of a glass lens and a hybrid lens that is configured of a glass substrate and a plastic lens having a curved surface which is layered onto said glass substrate, and wherein said focus detection optical system satisfies the following condition (3):

$$1.8 < p_1/p_2 < 2.2 \qquad (3),$$

wherein $p_1$ designates a refractive power of a first surface of said auxiliary lens, and $p_2$ designates a refractive power of a second surface of said auxiliary lens.

10. The focus detection optical system according to claim 9, wherein said focus detection optical system satisfies the following condition (4):

$$-0.47 < m_0/m_3 < -0.37 \qquad (4),$$

wherein $m_0$ designates a magnification of the entire said focus detection optical system, and $m_3$ designates a magnification of said auxiliary lens.

11. The focus detection optical system according to claim 9, wherein said separator lens comprises one of said hybrid lens and said glass lens that is configured of a single glass lens element, wherein said focus detection optical system further includes a separator lens mask positioned between said auxiliary lens and said separator lens and having a pair of apertures which face said pair of lenses of said separator lens, respectively, and wherein said focus detection optical system satisfies the following condition (5):

$$0 < (m_4-1) \cdot p \cdot t \cdot F/m_0 < 0.05 \text{ [mm]} \qquad (5)$$

wherein $m_4$ designates a magnification of said separator lens, p designates a apex-to-apex distance [mm] between said pair of lenses of said separator lens, t designates a linear expansion coefficient of one of said glass substrate and said glass lens of said separator lens due to a temperature change thereof by 30 degrees centigrade, F designates an f-number of said focus detection optical system that is determined by principal rays respectively passed through said pair of apertures of said separator lens mask, and $m_0$ designates a magnification of the entire said focus detection optical system.

12. The focus detection optical system according to claim 9, wherein said separator lens comprises a glass-molded lens which is molded by press molding.

* * * * *